US010942547B2

(12) United States Patent
Gault et al.

(10) Patent No.: US 10,942,547 B2
(45) Date of Patent: Mar. 9, 2021

(54) INDEXED SEQUENTIAL LOCK

(71) Applicant: Microsoft Technology Licensing, LLC, Redmond, WA (US)

(72) Inventors: Joseph Benjamin Gault, Seattle, WA (US); Scott Douglas Bowers, Woodinville, WA (US); Anthony E. Hillyerd, Sammamish, WA (US); Yazan Aldehayyat, Seattle, WA (US); Duane Martin Evans, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 16/143,826

(22) Filed: Sep. 27, 2018

(65) Prior Publication Data
US 2019/0025890 A1 Jan. 24, 2019

Related U.S. Application Data

(62) Division of application No. 15/346,528, filed on Nov. 8, 2016, now Pat. No. 10,133,315.

(51) Int. Cl.
*E05B 47/00* (2006.01)
*G06F 1/16* (2006.01)
(Continued)

(52) U.S. Cl.
CPC ........ *G06F 1/1679* (2013.01); *E05B 15/0046* (2013.01); *E05B 47/0001* (2013.01);
(Continued)

(58) Field of Classification Search
CPC ............. E05B 15/0046; E05B 47/0001; E05B 47/0009; E05B 47/00; E05B 65/0067; E05B 2047/0016; G06F 1/1679; G06F 21/86
(Continued)

(56) References Cited

U.S. PATENT DOCUMENTS 1,609,646 A * 12/1926 Focht ..................... E05B 47/00
70/282
1,795,085 A * 3/1931 Dwyer .................. G06M 1/042
235/131 R
(Continued)

FOREIGN PATENT DOCUMENTS

CN 1707099 A 12/2005
CN 1714375 A 12/2005
(Continued)

OTHER PUBLICATIONS

"First Office Action and Search Report Issued in Chinese Patent Application No. 201780069105.4", dated Apr. 3, 2020, 17 Pages.

*Primary Examiner* — Suzanne L Barrett
(74) *Attorney, Agent, or Firm* — Ray Quinney & Nebeker P.C.; Paul N. Taylor

(57) ABSTRACT

A lock for actively locking an electronic device includes an engagement member that is movable by an actuator. The actuator moves the engagement member to the locked position with a first amount of power from the power source and from the locked position to an unlocked position with a second amount of power from the power source. The engagement member will passively remain in the unlocked position or the locked position.

20 Claims, 12 Drawing Sheets

(51) Int. Cl.
  *G06F 21/86* (2013.01)
  *E05B 15/00* (2006.01)
  *E05B 65/00* (2006.01)
(52) U.S. Cl.
  CPC ...... *E05B 47/0009* (2013.01); *E05B 65/0067* (2013.01); *G06F 21/86* (2013.01); *E05B 2047/0016* (2013.01)
(58) Field of Classification Search
  USPC .................................................. 70/278.7
  See application file for complete search history.

(56) References Cited

U.S. PATENT DOCUMENTS

| | | | | |
|---|---|---|---|---|
| 2,491,779 A * | 12/1949 | Smith | E05B 37/166 | 70/305 |
| 2,523,765 A * | 9/1950 | Johansson | B41K 3/102 | 101/72 |
| 3,231,135 A * | 1/1966 | Starbuck | B67D 7/3236 | 222/26 |
| 3,274,717 A * | 9/1966 | Herr, Sr. | G04C 17/0083 | 40/111 |
| 3,461,277 A * | 8/1969 | Barrett | G06M 1/104 | 377/92 |
| 3,487,700 A * | 1/1970 | Emery | G06M 3/02 | 74/3.52 |
| 3,565,477 A * | 2/1971 | Hull | E05B 47/0607 | 292/336 |
| 3,654,860 A * | 4/1972 | Speicher | B41F 33/009 | 101/110 |
| 3,722,237 A * | 3/1973 | Taylor | E05C 7/02 | 70/107 |
| 3,802,281 A * | 4/1974 | Clarke | F16H 25/2021 | 74/89.39 |
| 3,819,126 A * | 6/1974 | Stoffel | B60R 22/405 | 242/383.1 |
| 3,909,966 A * | 10/1975 | Sato | G09D 3/06 | 40/107 |
| RE29,594 E * | 3/1978 | Takada | B60R 22/405 | 242/383.4 |
| 4,172,462 A * | 10/1979 | Uchida | G07D 3/16 | 453/35 |
| 4,185,792 A * | 1/1980 | Weman | B60R 22/38 | 242/383.4 |
| 4,429,841 A * | 2/1984 | Kassai | B60R 22/38 | 242/383.4 |
| 4,492,349 A * | 1/1985 | Stamboulian | B60R 22/41 | 242/384.1 |
| 4,635,491 A * | 1/1987 | Yamano | B66B 9/025 | 187/209 |
| 4,747,319 A * | 5/1988 | Sakuta | B62D 33/07 | 74/411.5 |
| 4,810,115 A * | 3/1989 | Hori | B41J 7/48 | 101/93.22 |
| 4,945,196 A * | 7/1990 | Mahon | H01H 43/101 | 200/38 A |
| 5,265,823 A * | 11/1993 | Doty | B60R 22/44 | 242/372 |
| 5,597,441 A * | 1/1997 | Volk | B65C 11/02 | 156/384 |
| 5,862,692 A * | 1/1999 | Legault | E05B 47/0688 | 70/278.1 |
| 5,924,919 A * | 7/1999 | Hirano | G07D 9/008 | 453/57 |
| 6,008,992 A * | 12/1999 | Kawakami | E05B 47/0009 | 292/137 |
| 6,310,411 B1 * | 10/2001 | Viallet | H01H 61/0107 | 307/125 |
| 6,314,773 B1 * | 11/2001 | Miller | E05B 17/2084 | 292/142 |
| 8,157,300 B2 * | 4/2012 | Niskanen | E05B 47/0009 | 292/201 |
| 8,891,248 B2 * | 11/2014 | Chu | F16M 11/10 | 248/122.1 |
| 10,133,315 B2 * | 11/2018 | Gault | E05B 65/0067 | |
| 2006/0012191 A1 * | 1/2006 | Brei | E05B 47/0009 | 292/341.17 |
| 2009/0079240 A1 * | 3/2009 | Bach | B60N 2/919 | 297/217.3 |
| 2010/0077810 A1 * | 4/2010 | De Franceschi | G01G 15/00 | 70/283.1 |
| 2011/0291846 A1 * | 12/2011 | Burdenko | E05B 47/0004 | 340/635 |
| 2012/0074201 A1 * | 3/2012 | Baxter, III | A61B 17/07207 | 227/180.1 |
| 2013/0152646 A1 * | 6/2013 | Field | E05B 47/063 | 70/283 |
| 2014/0084762 A1 * | 3/2014 | Lai | H05K 5/0004 | 312/223.1 |
| 2014/0193193 A1 * | 7/2014 | Wikander | G06F 1/1626 | 403/322.1 |
| 2014/0210219 A1 * | 7/2014 | Pipp | D06F 39/14 | 292/144 |
| 2015/0013398 A1 * | 1/2015 | Taylor | E05B 47/0009 | 70/20 |
| 2015/0101370 A1 * | 4/2015 | Russo | E05B 47/0001 | 70/263 |
| 2015/0322695 A1 * | 11/2015 | Chow | E05B 65/00 | 109/44 |
| 2016/0047363 A1 * | 2/2016 | Alacqua | F16K 31/025 | 251/213 |
| 2017/0074019 A1 * | 3/2017 | Schweiss | E05B 53/003 | |
| 2019/0380426 A1 * | 12/2019 | Sun | A43B 3/06 | |

FOREIGN PATENT DOCUMENTS

| | | |
|---|---|---|
| CN | 202144692 U | 2/2012 |
| CN | 202441137 U | 9/2012 |
| CN | 105378195 A | 3/2016 |

\* cited by examiner

INDEXED SEQUENTIAL LOCK

CROSS-REFERENCE TO RELATED APPLICATIONS

This application is a divisional of U.S. patent application Ser. No. 15/346,528, filed Nov. 8, 2016, which is hereby incorporated by reference in its entirety.

BACKGROUND

Background and Relevant Art

Use of computing devices is becoming more ubiquitous by the day. Computing devices range from standard desktop computers to wearable computing technology and beyond. One area of computing devices that has grown in recent years is the hybrid computers. Hybrid computers may act as a tablet computer or a laptop computer. Many hybrid computers include input devices and or electronic components that may be separated from the display or other electronic components.

When using a hybrid computer in a high demand application, such as a graphic intensive application or a power intensive application, disconnection of the first body of the hybrid computer from the second body of the hybrid computer results in faults in the application or damage to the electronic components.

Conventional locking mechanisms in hybrid computers are biased toward a locked state or an unlocked state. For example, moving the locking mechanism from a locked state to an unlocked state, or vice versa, includes applying a force or electricity to the locking mechanism. Removal of the force or electricity causes the locking mechanism to revert to the previous state. Continual application of force or electricity may reduce battery life and/or increase wear on the components of the locking mechanism.

The subject matter claimed herein is not limited to implementations that solve any disadvantages or that operate only in environments such as those described above. Rather, this background is only provided to illustrate one exemplary technology area where some implementations described herein may be practiced.

BRIEF SUMMARY

In an implementation, a device for actively locking an electronic device includes an engagement member and an actuator. The engagement member is movable between a locked position and an unlocked position. The actuator is instantiated by a power source and configured to move the engagement member between the locked position and the unlocked position. The actuator uses a first amount of power to move the engagement member to a locked position. The actuator uses a second amount of power to move the engagement member to the unlocked position. The actuator uses a third amount of power, the third amount being less than the first amount and less than the second amount, to retain the engagement member in the locked position and in the unlocked position.

In another implementation, a device for sequential actuation of a two-state device includes a wheel and an actuator. The wheel includes a first circumferential profile and a second circumferential profile. The first circumferential profile has a plurality of notches with a first period to advance the wheel in a first direction. The Second circumferential profile has a periodic radial dimension with a second period greater than the first period. The actuator is in contact with the first circumferential profile and configured to apply a force to at least one of the notches of the plurality of notches to rotate the wheel.

In some implementations, a third amount of power may be 2,000 mW.

In yet another implementation, a method of locking an electronic device with a locking mechanism includes receiving a demand status from the electronic device, checking a lock status of the locking mechanism, actuating the locking mechanism, and updating the lock status after actuating the locking mechanism. Actuating the locking mechanism moves the locking mechanism to a locked state or an unlocked state based at least partially upon the demand status.

In some implementations, a third amount of power may be 2,000 mW.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to locking apparatuses, systems, and methods. More particularly, this disclosure generally relates to locking apparatuses, systems, and methods for securing computing devices. The present disclosure may describe one or more implementations of sequential locking devices, systems, and methods that positively lock at least one part of a computing device to another component or peripheral of the computing device. While implementations of locking devices and systems may be described herein in relation to computing devices, it should be understood that at least one implementation described herein may be used in other devices, systems, and methods.

In some implementations, a lock according to the present disclosure may provide sequential locking to a device or system. For example, an implementation of a lock described herein may be actuated sequentially by repeated application of force in the same direction. In other words, the lock may be actuated in a "push-push" fashion, allowing the lock to be moved between states by iterating through sequential actuation.

In some implementations, a lock may have two states, a locked state and an unlocked state. The lock may move from a locked state to an unlocked state by a first application of force in a first direction. The lock may move from the unlocked state to the locked state by a second application of force in the first direction. The lock may further move from the locked state to the unlocked state again by a third application of force in the first direction. In other implementations, a lock may have any number of states attainable by repeated, sequential applications of force in a first direction.

Figure 1:
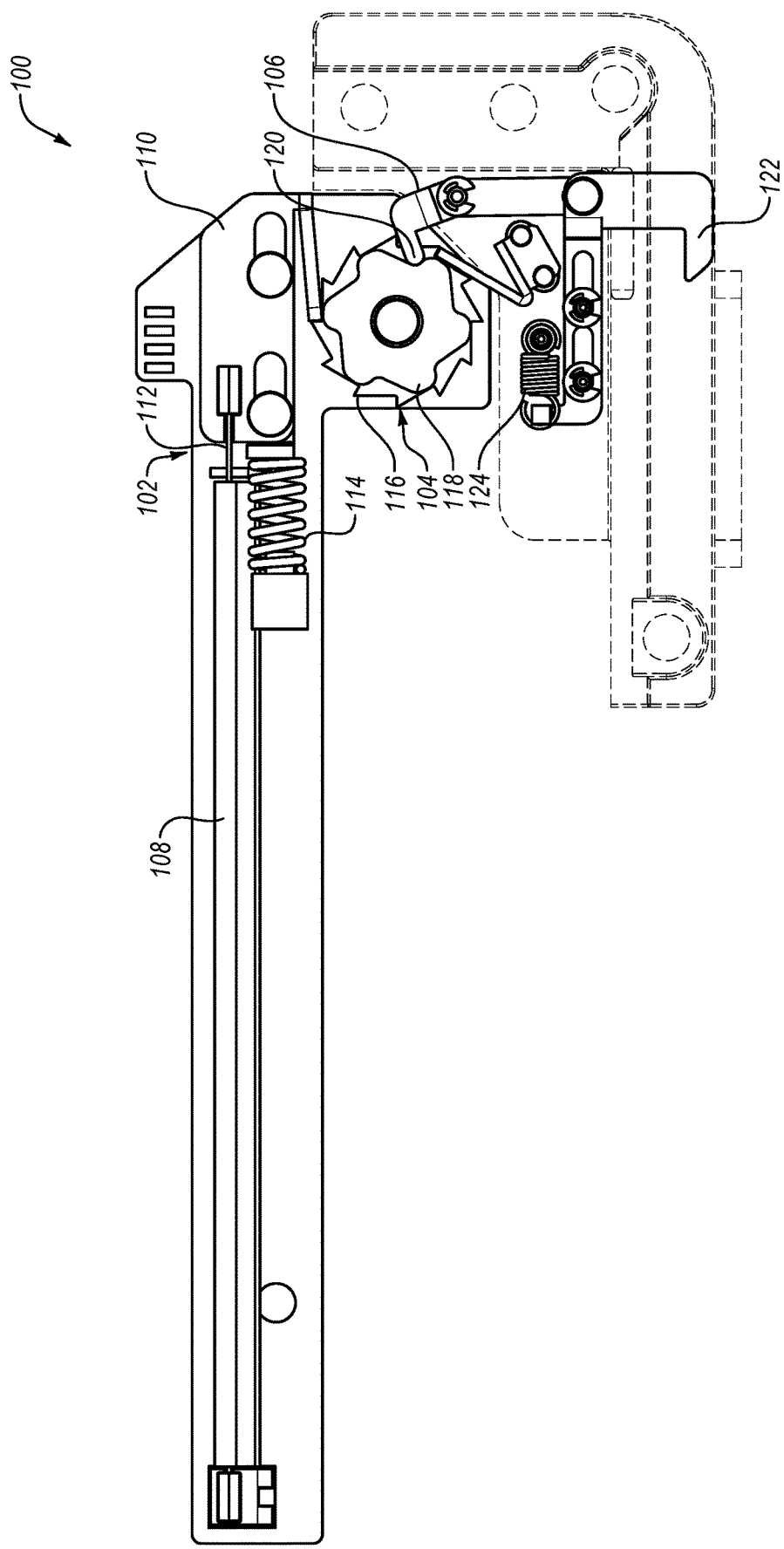
FIG. 1 is a side view of an implementation of a locking mechanism, according to some implementations of the present disclosure.

FIG. 1 illustrates an implementation of a locking mechanism 100 according to the present disclosure. The locking mechanism 100 includes an actuator 102 configured to apply a force in a first direction to a wheel 104. The wheel 104 may contact a lever 106 and move the lever 106 as the wheel 104 rotates relative to the lever 106.

In some implementations, the actuator 102 includes a power source 108 and a contact plate 110. The implementation of a power source 108 illustrated in FIG. 1 is in communication with a shape-memory material (SMM) wire 112. For example, the SMM wire 112 may include or be a shape-memory alloy, such as Nitinol, a shape-memory polymer, or other shape-memory material. In some implementations, the SMM wire 112 may have a plurality of microstructural states (e.g., an austenitic state and a martensitic state) that are at least partially related to the temperature of the SMM wire 112. For example, changing the temperature of the SMM wire 112 may move the SMM wire 112 from a first microstructural state to a second microstructural state. In other implementations, the SMM wire 112 may have a plurality of microstructural states (i.e., an austenitic state and a martensitic state) that are at least partially related to the electrical state of the SMM wire 112. For example, the SMM wire 112 may move from a first microstructural state to a second microstructural state by changing an electrical current and/or electrical potential across the SMM wire 112.

In some implementations, the plurality of microstructural states may allow the SMM wire 112 to exhibit one or more "remembered" macrostructural states. For example, the power source 108 may apply an electrical current to the SMM wire 112, apply an electrical potential to the SMM wire 112, alter the temperature of the SMM wire 112, otherwise alter the SMM wire 112, or combinations thereof to change the SMM wire 112 from the first microstructural state to the second microstructural state. In at least one example, the SMM wire 112 may shorten in longitudinal length upon moving from the first microstructural state to the second microstructural state.

In some implementations, the SMM wire 112 may apply a force to the contact plate 110. The contact plate 110 may be configured to move in the longitudinal direction (i.e., the direction of movement of the SMM wire 112) from an initial position. The contact plate 110 may translate the force from the SMM wire 112 to the wheel 104. Upon the SMM wire 112 returning to the first microstructural state (e.g., the longer microstructural state), a biasing element 114 may urge the contact plate 110 in the second direction and may reset the contact plate 110 to the initial position. In some implementations, the biasing element 114 may include or be a coil spring, a leaf spring, a Belleville spring, a bushing, a compressible fluid, other resilient member, or combinations thereof.

The wheel 104 may have a plurality of circumferential profiles. In some implementations, the wheel 104 may have a first circumferential profile 116 and a second circumferential profile 118. For example, the first circumferential profile 116 may be a discontinuous circumferential profile, allowing unidirectional movement of the wheel 104 relative to the contact plate 110 or other actuator 102. In other examples, the first circumferential profile 116 is any other circumferential profile that provides unidirectional movement of the wheel. In at least one example, the first circumferential profile 116 has a sawtooth pattern, similar to that shown in FIG. 1.

The wheel 104 may have a second circumferential profile 118 with a radially outer surface configured to contact the lever 106. The second circumferential profile 118 may have a periodically varying radius that moves the lever 106 in a periodic and/or cyclic pattern. The lever 106 may have a thumb 120 that contacts the second circumferential profile 118 and rides along the radially outer surface of the second circumferential profile 118.

The lever 106 may include and/or connect to an engagement member 122. The engagement member 122 may include a hook, a latch, a pin, a prong, a tooth, a clip, or any other structure that mechanically interlocks with another physical feature to limit or prevent movement of the locking mechanism 100 relative to the physical feature. In some implementations, the engagement member 122 may translate in an arc scribed by the lever 106. In other implementations, the engagement member 122 may translate in a linear path as the level 106 moves.

In some implementations, the movement of the lever 106 and/or engagement member 122 may be biased by a biasing element 124. In some implementations, the biasing element 124 may include or be a coil spring, a leaf spring, a Belleville spring, a bushing, a compressible fluid, other resilient member, or combinations thereof.

Figure 2:
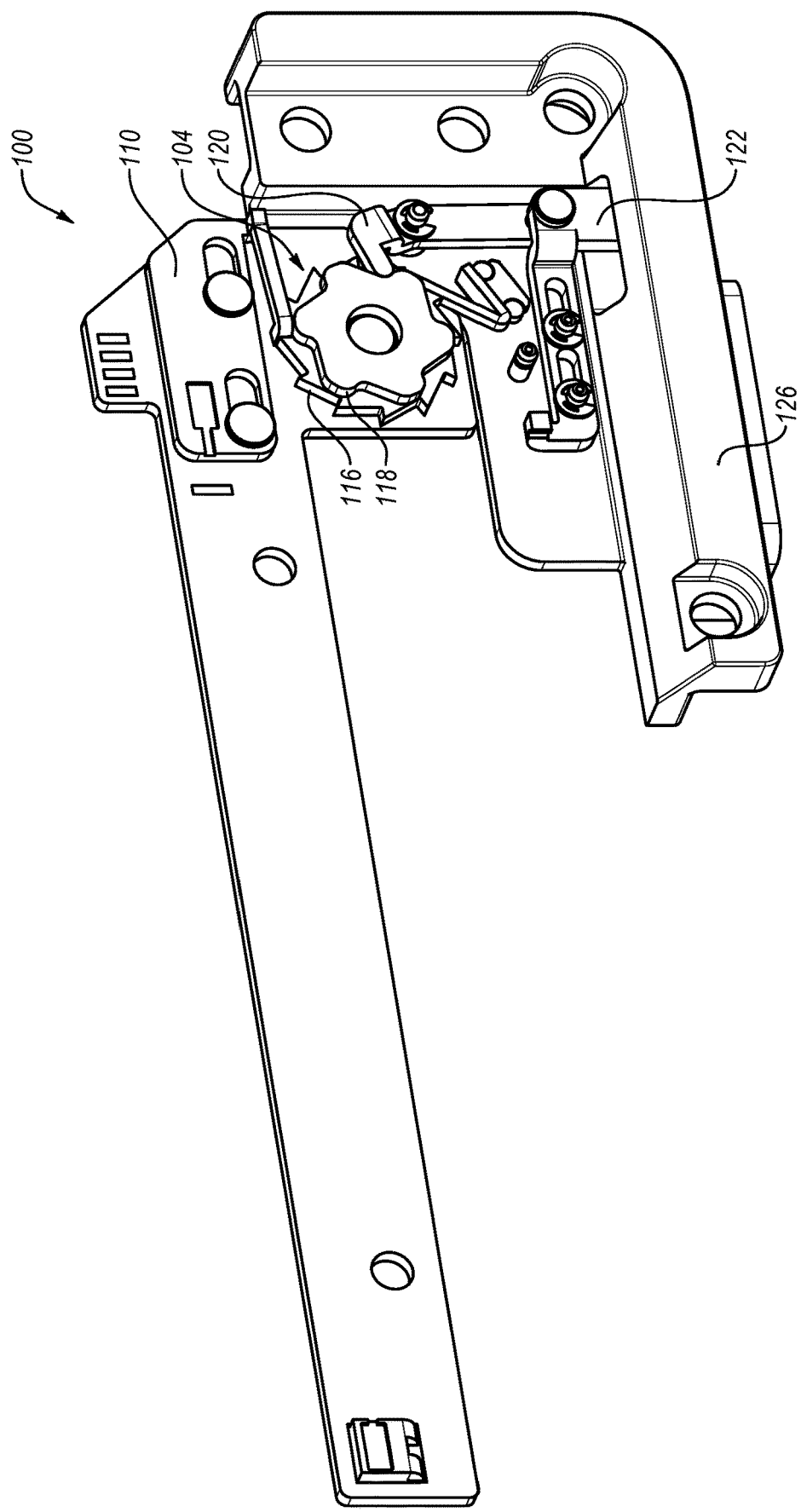
FIG. 2 is a perspective view of the implementation of a locking mechanism of FIG. 1, according to some implementations of the present disclosure.

Referring now to FIG. 2, the locking mechanism 100 is shown in perspective to illustrate the relative position of the first circumferential profile 116 and second circumferential profile 118 of the wheel 104. The contact plate 110 interacts with the first circumferential profile 116 of the wheel 104 to rotate the wheel 104. The rotation of the wheel 104 then moves the thumb 120 as the second circumferential profile 118 moves relative to the thumb 120.

The first circumferential profile 116 may be substantially adjacent to the second circumferential profile 118 in the axial direction of the wheel 104. In other implementations, the first circumferential profile 116 may be axially displaced from the second circumferential profile 118. For example, a wheel 104 may have more than two circumferential profiles and a third circumferential profile may be positioned between the first circumferential profile 116 and the second circumferential profile.

In some implementations, the locking mechanism 100 may include a receiver plate 126 that at least partially surrounds the engagement member 122. The receiver plate 126 may receive a complimentary engagement feature with which the engagement member 122 may engage to limit movement of the locking mechanism 100.

Figure 3:
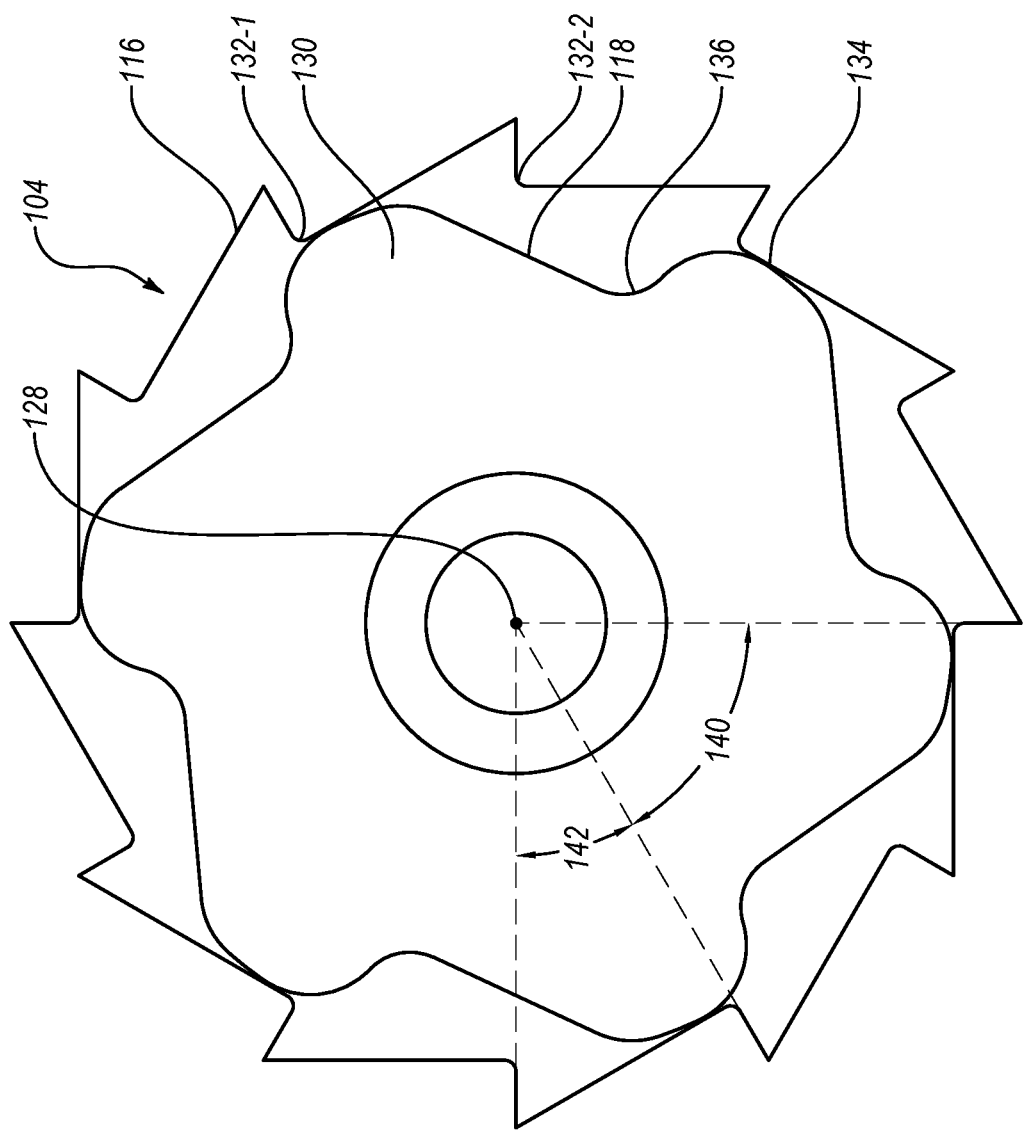
FIG. 3 is a detail view of an implementation of a wheel of the locking mechanism of FIG. 1, according to some implementations of the present disclosure.

FIG. 3 is an axial view of the implementation of a wheel 104 of FIG. 1. The wheel 104 has a first circumferential profile 116 and a second circumferential profile 118, as described herein. The first circumferential profile 116 is a drive profile that allows for a unidirectional rotation of the wheel 104. The second circumferential profile 118 is a periodic profile that applies a force in the radial direction with a series of lobes 130.

In some implementations, the first circumferential profile 116 is a sawtooth profile, as shown in FIG. 3. The first circumferential profile 116 has a period that is defined by the rotational distance between a first notch 132-1 and a second notch 132-2. For example, the wheel 104 may rotate about a rotational axis 128 a given amount when the first notch 132-1 receives a force from an actuator (such as actuator 102 in FIG. 1). The actuator may engage with the first notch 132-1, apply a linear force to the first notch 132-1, and then engage the second notch 132-2. Application of force to the second notch 132-2 may rotate the wheel 104, allowing the actuator to engage with another notch, and so forth.

In some implementations, the positioning of the first notch 132-1 may correspond to a local maximum radius 134 of the second circumferential profile 118. Additionally, the positioning of the second notch 132-2 may correspond to a local minimum radius 136 of the second circumferential profile 118. For example, each sequential actuation of the actuator may rotate the wheel forward by one notch (i.e., from the first notch 132-1 to the second notch 132-2 of the first circumferential profile 116) and from the local maximum radius 134 to the local minimum radius 136 of the second circumferential profile 118. In other implementations, at least one of the notches may be angularly displaced from a local maximum radius 134 or the local minimum radius 136.

In some implementations, a second circumferential period 140 may be greater than a first circumferential profile period 142. For example, the second circumferential period 140 may be double the first circumferential profile period 142, as shown in FIG. 3. In other implementations, the second circumferential period 140 may be an integer multiple of the first circumferential profile period 142. For example, the second circumferential period 140 may be greater than a first circumferential profile period 142 by a factor of 2, 3, 4, 5, 6, or greater.

Figure 4:
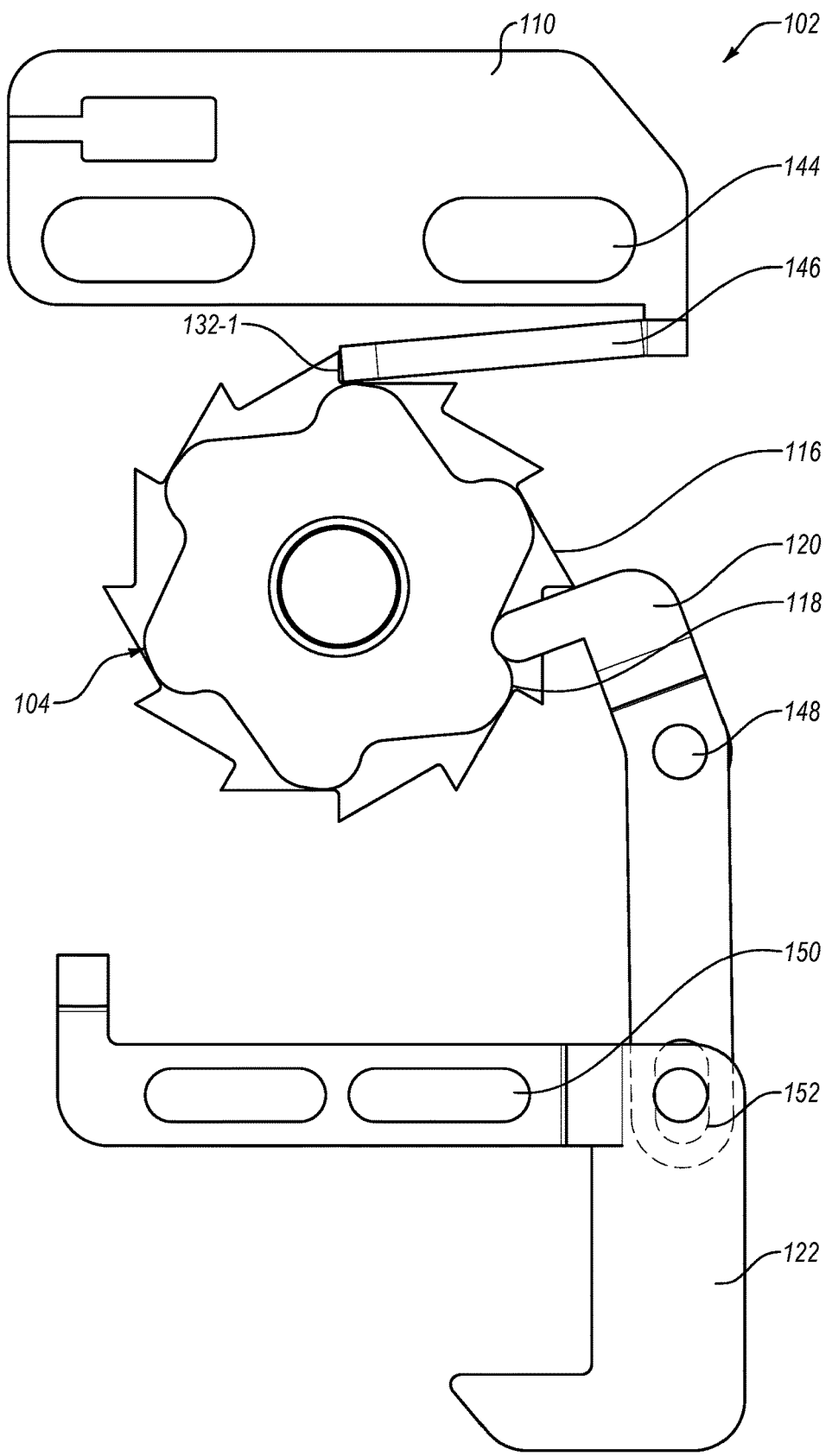
FIG. 4 is a detail view of an implementation of the wheel of FIG. 3 engaged with a contact arm and a lever, according to some implementations of the present disclosure.

FIG. 4 illustrates an implementation of the contact plate 110 of the actuator 102 engaged with the first notch 132-1 of the wheel 104. In some implementations, the contact plate 110 may translate relative to the wheel 104. For example, the contact plate 110 may have elongated openings 144 through which mechanical fasteners may travel. The translational movement of the contact plate 110 relative to the mechanical fasteners may allow the contact plate 110 to engage with and turn the wheel 104.

As described herein, the contact plate 110 may translate by an actuator 102 including a SMM wire. In other implementations, the actuator may include a stepper motor, a squiggle motor, a magnetic linear actuator, a piezoelectric motor, a solenoid, any other motor that provides linear motion, or a combination thereof.

In some implementations, a contact arm 146 may engage with the first circumferential profile 116 in the first notch 132-1 to apply a force to the wheel 104. The contact arm 146 may be a resilient member such that the contact arm 146 applies a force to the wheel 104 in a radial direction. The contact arm 146 may, therefore, track along the first circumferential profile 116 so that the contact arm 146 remains in contact with the wheel 104 during translational movement of the contact plate 110.

Moving the contact plate 110 to rotate the wheel 104 to a locked position may use a first amount of power from a power source. In some implementations, the first amount of power may be in a range between 5 and 10 watts, which in some implementations may be the peak power consumption. In some embodiments, the peak power consumption may be 7.5 watts. In some implementations, a total amount of energy required to move the contact plate 110 to rotate the wheel 104 to a locked position may be between 10 and 20 Joules. In some embodiments, the total amount of energy required may be about 15 Joules.

Moving the contact plate 110 to rotate the wheel 104 to an unlocked position may use a second amount of power from a power source. The second amount of power may be greater than, less than, or the same as the first amount of power. In some implementations, the second amount of power may be in a range between 10 and 20 watts, which in some implementations may be the peak power consumption. In some embodiments, the peak power consumption may be 15 watts. In some implementations, a total amount of energy required to move the contact plate 110 to rotate the wheel 104 to an unlocked position may be between 25 and 35 Joules. In some embodiments, the total amount of energy required may be about 30 Joules.

Holding the wheel 104 in a given state may use a third amount of power from a power source. In some implementations, the third amount of power may be may be less than both the first amount of power and the second amount of power. For example, the wheel 104 may be rotated to actuate the wheel to an unlock position and/or a locked position, while passive spring tension may retain the wheel 104 in an given position. In at least one implementation, the third amount of power is, essentially zero, as there is no energy consumed to hold the wheel 104 in a given state.

In some implementations, the thumb 120 may be in contact with the second circumferential profile 118 of the wheel 104. The thumb 120 may rotate the lever 106 about the pivot 148 in the lever 106. The rotational movement of the lever 106 may then urge the engagement member 122 to move.

In some implementations, the engagement member 122 may have one or more elongated openings 150 therein that allow the engagement member 122 to translate relative to the lever 106. For example, the connection between the lever 106 and the engagement member 122 may include an elongated opening 152 that allows the connection point to float relative to the pivot 148 of the lever 106. In some implementations, the elongated opening 152 of the contact between the engagement member 122 and the lever 106 may allow the engagement member 122 to translate without the lever 106 imparting a force or motion in a direction other than the translational direction of the engagement member 122.

In some implementations, the rotation of the wheel 104 may be limited to a unidirectional rotation by the contact arm 146. In other implementations, a ratcheting device may be in contact with the wheel 104 to limit the rotation of the wheel 104 in at least one direction. For example, in the implementation depicted in FIG. 5, a ratchet arm 256 may engage with the wheel 204 to limit and/or prevent rotation of the wheel 204 in a second direction.

Figure 5:
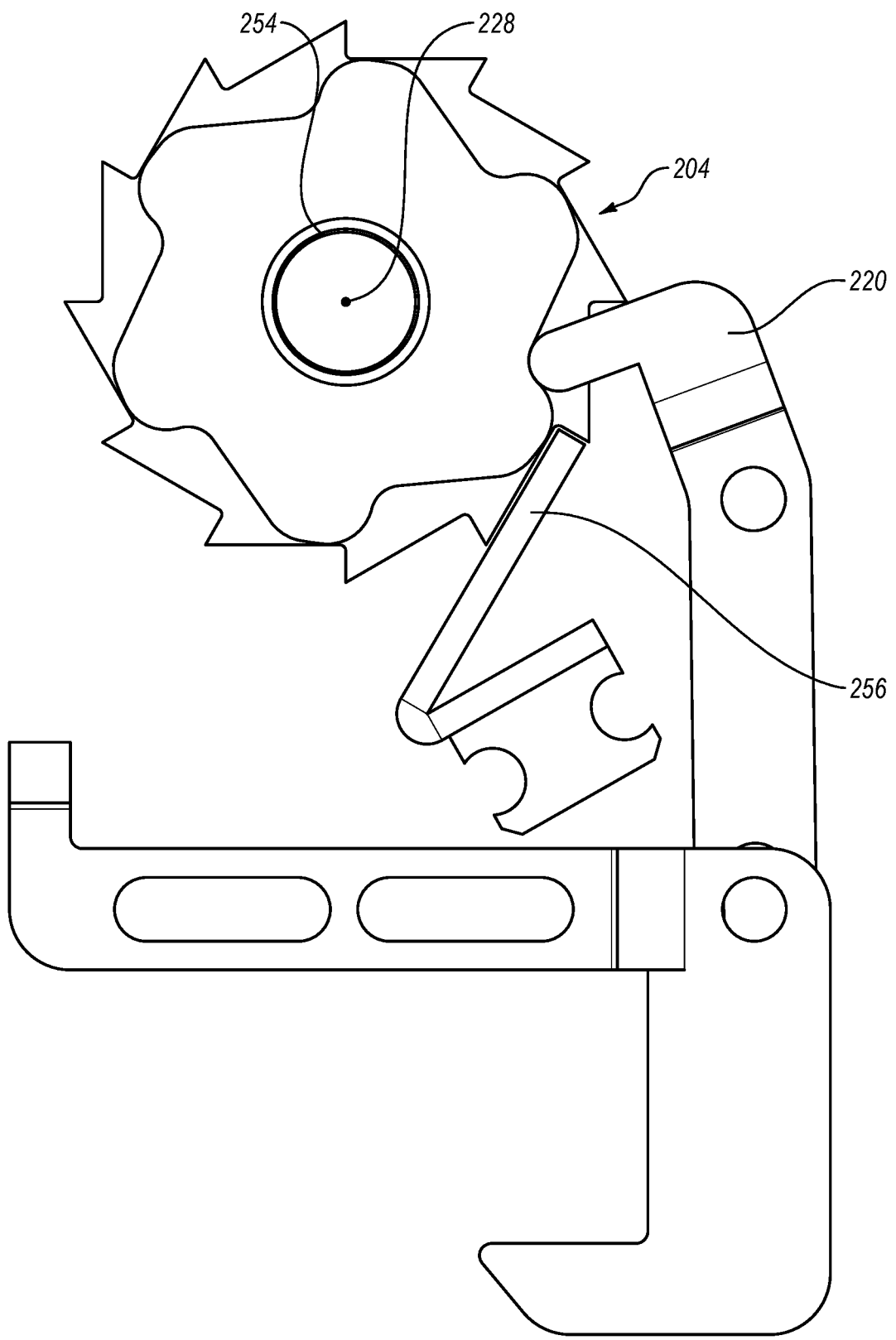
FIG. 5 is a detail view of an implementation of a wheel and a rotary actuator, according to some implementations of the present disclosure.

FIG. 5 illustrates an implementation of a wheel 204 that is actuated by a rotational motor 254 that is configured to rotate about the rotational axis 228 of the wheel 204. In other implementations, a rotational motor 254 may rotate about a different axis and may be operably coupled to the wheel 204 through one or more gears, cables, chains, or other power transfer elements. In the implementation of a locking mechanism 100 in FIG. 1, the actuator 102 may apply force to the wheel 104 in one direction. In the implementation depicted in FIG. 5, the rotational motor 254 may rotate in either direction. In such implementations, rotation of the wheel 204 may be limited by the ratchet arm 256 interacting with the wheel 204.

In some implementations, the ratchet arm 256 may be a resilient member such that ratchet arm 256 applies a force to the wheel 204 in a radial direction. The ratchet arm 256 may, therefore, track along a radial profile of the wheel 204 so that the ratchet arm 256 remains in contact with the wheel 204 during rotational movement of the wheel 204.

Figure 6:
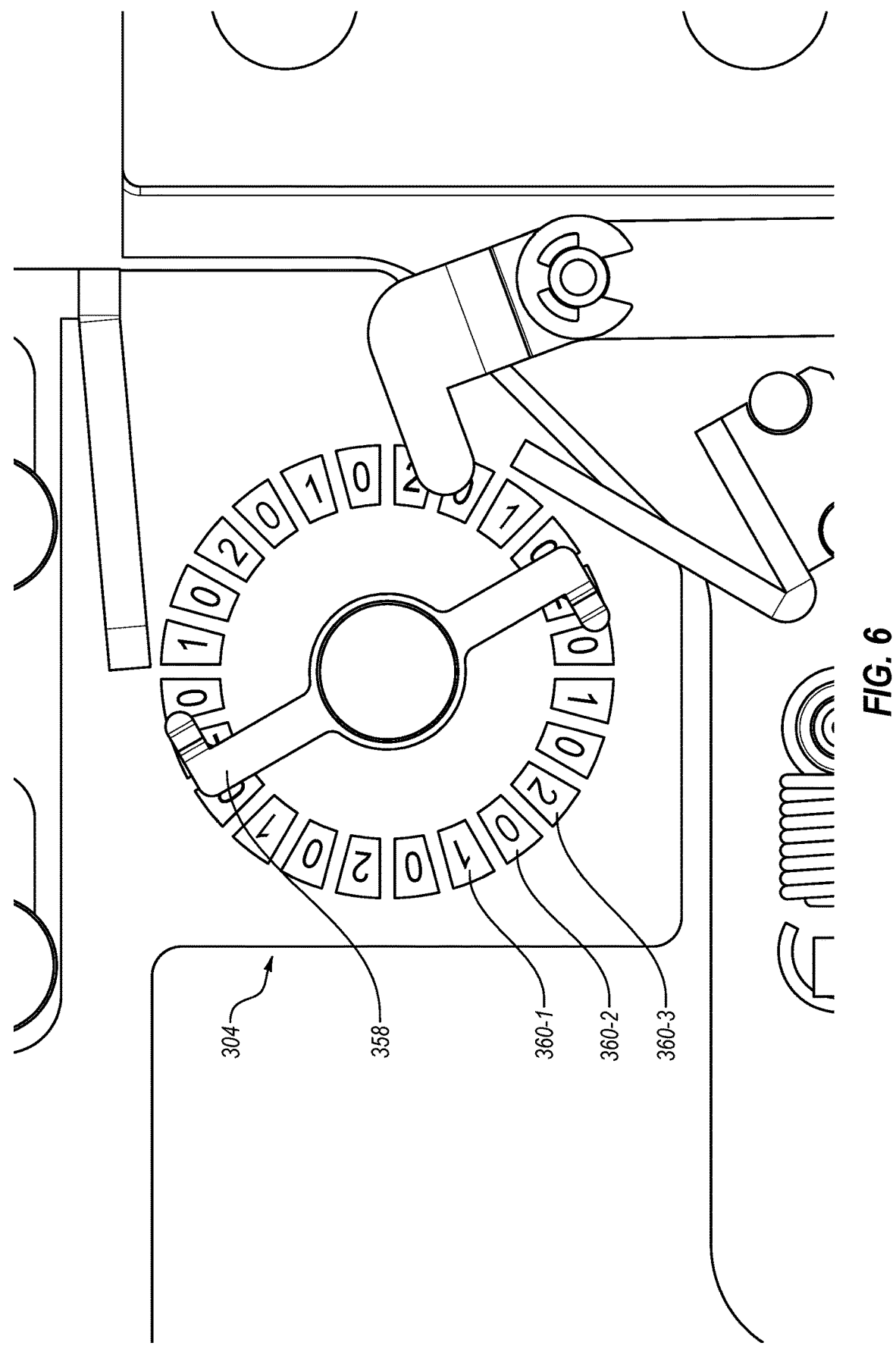
FIG. 6 is a partial cutaway view of an implementation of a wheel with an encoder arm contacting a plurality of contacts corresponding to an orientation of the wheel, according to some implementations of the present disclosure.

In some implementations, it may be beneficial to monitor or sample the state of the wheel. FIG. 6 illustrates an implementation of an encoder arm 358 that may be connected to a surface of a wheel 304 (the body of the wheel 304 is not shown in order to see the encoder arm 358). The encoder arm 358 may provide electrical communication with one or more of a plurality of contacts 360 adjacent the wheel 304. The contacts 360 may allow for the sampling and/or detection of the position of the encoder arm 358 and the associated wheel 304. The position of the wheel 304 may be correlated to the state of the lock (i.e., a locked state or an unlocked state).

The contacts 360 may include a first contact 360-1 corresponding to a first state (e.g., a locked state of the lock), a second contact 360-2 corresponding to an intermediate or transitory state of the lock, and a third contact 360-3 corresponding to a second state of the lock (e.g., an unlocked state of the lock).

In some implementations, the contacts 360 may be pressure sensitive, such as a button. In other implementations, the contacts 360 may be electrical contacts and/or the contacts 360 may be part of a printed circuit board (PCB). In some implementations, the encoder arm 358 may contact a first contact 360-1 and indicate that the lock is in a first state. In other implementations, the encoder arm 358 may contact a first contact 360-1 and a radially opposing contact to form an electrical circuit indicating the lock is in a first state. The encoder arm 358 and/or contacts 360 may communicate the state of the wheel 304 to one or more devices or users.

Figure 7A:
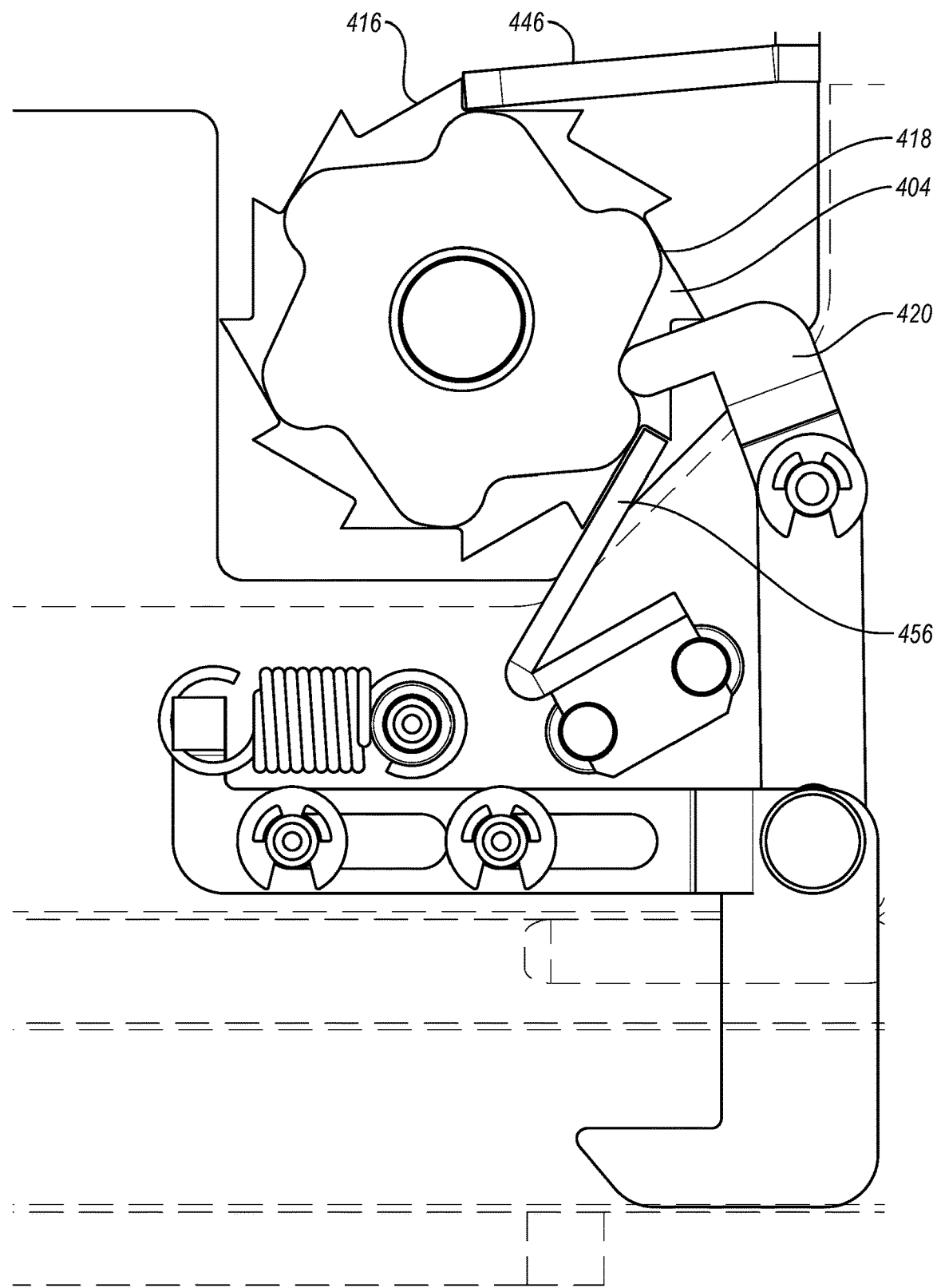
FIGS. 7A through 7D illustrate an implementation of actuating a wheel and moving an engagement member with a lever contacting the wheel, according to some implementations of the present disclosure.

FIG. 7A through 7D illustrate the actuation of an implementation of a lock. FIG. 7A illustrates a contact arm 446 in contact with a first circumferential profile 416 of a wheel 404. As the contact arm 446 applies a force to the wheel 404, the wheel 404 may begin to rotate. The rotation of the wheel 404 may cause the first circumferential profile 416 to apply a radially outward force to the ratchet arm 456, elastically deforming or otherwise moving the ratchet arm 456. The rotation of the wheel 404 may cause the second circumferential profile 418 to apply a radially outward force to a thumb 420.

Figure 7B:
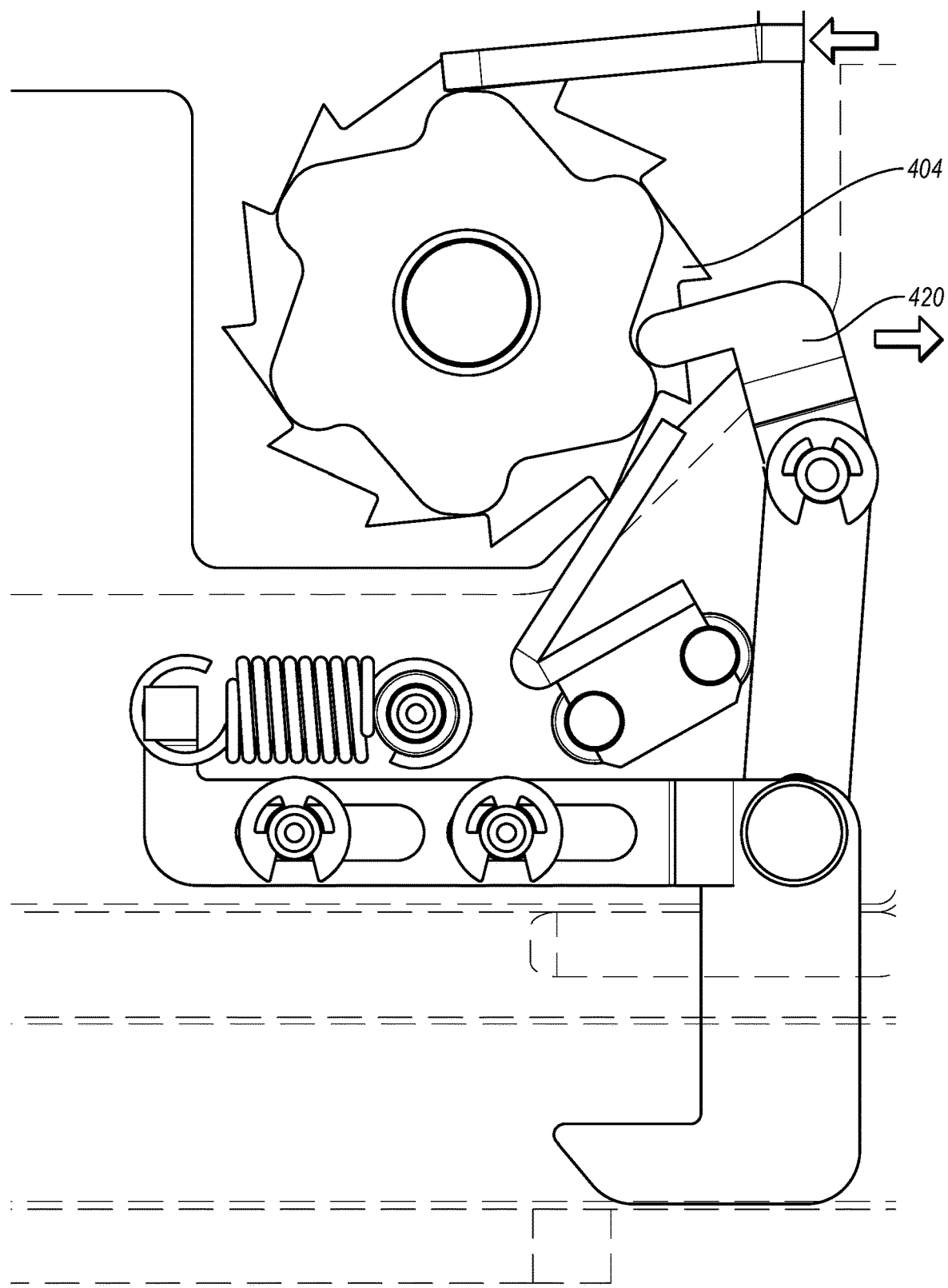
Figure 7C:
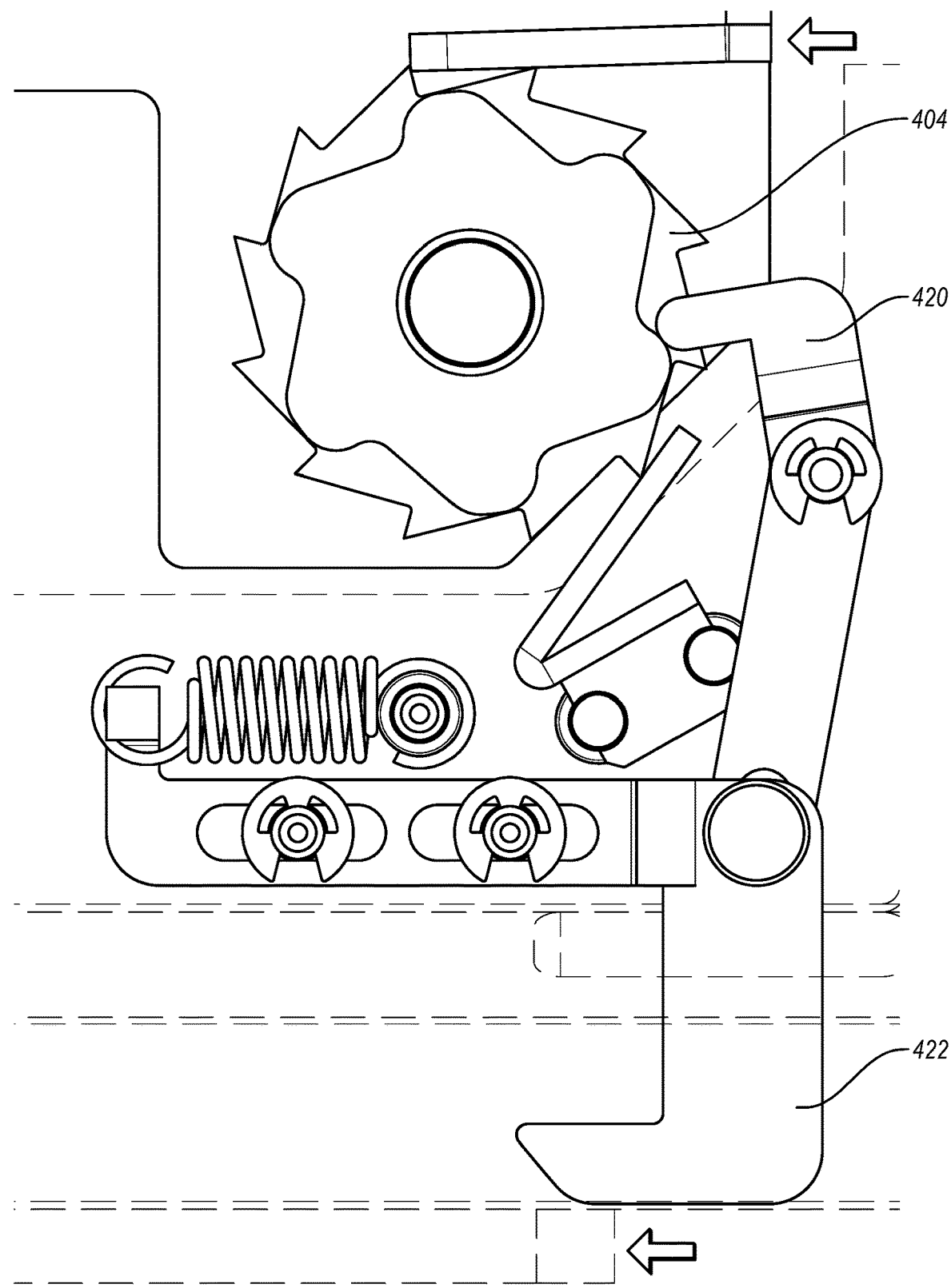
Figure 7D:
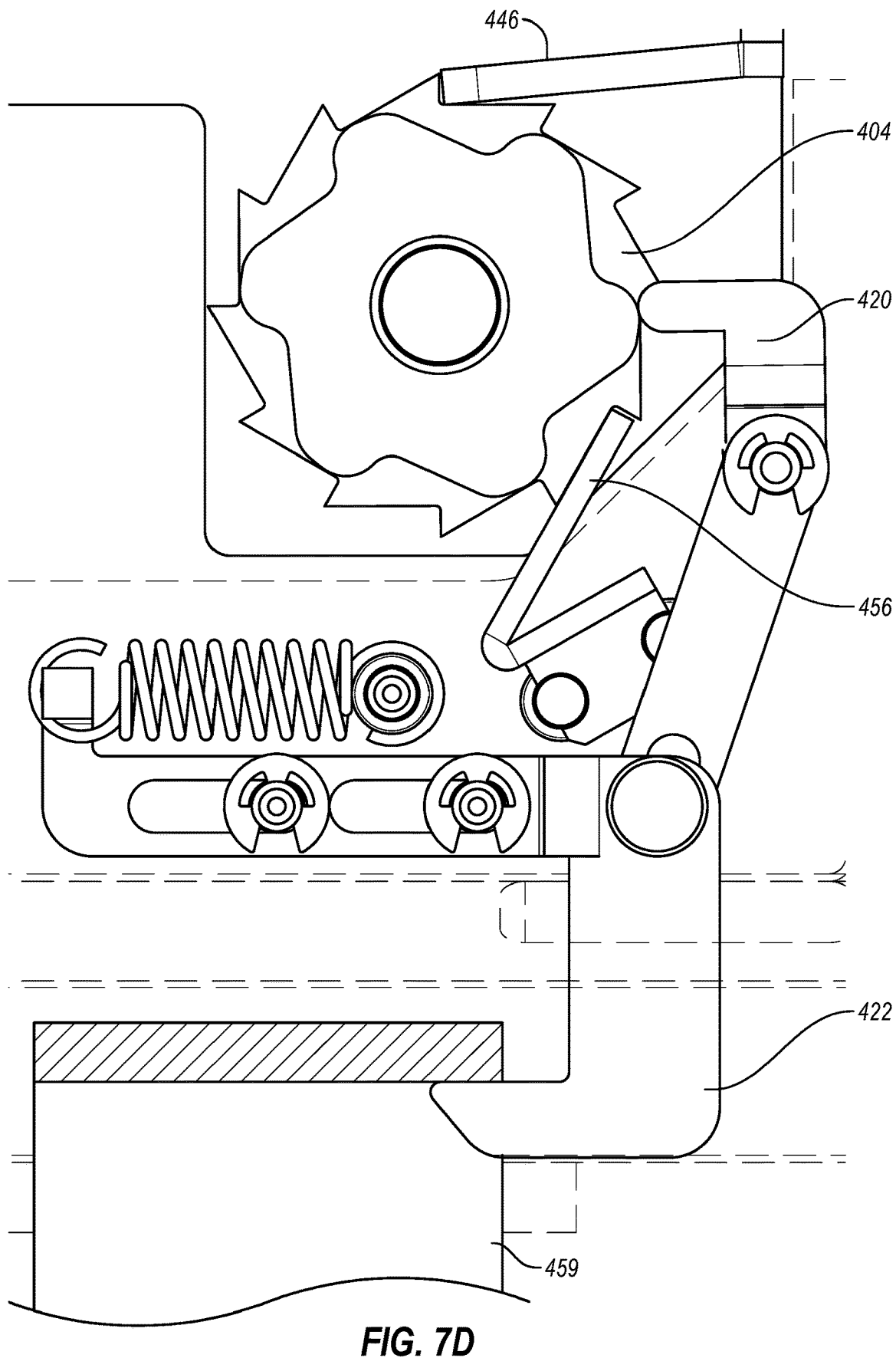

FIG. 7B illustrates an intermediate state of the rotation of the wheel 404 with the thumb 420 moving radially outward, and FIG. 7C illustrates the radially outward movement of the thumb 420 translating the engagement member 422 toward a locked position. FIG. 7D illustrates the engagement member 422 in the locked position and the contact arm 446 and ratchet arm 456 reset to their original positions, respectively. The thumb 420 in a radially outermost position relative to the wheel 404 and the ratchet arm 456 limits and/or prevents rotation of the wheel in the opposite direction to limit and/or prevent the engagement member 422 from returning to an unlocked position unintentionally.

Figure 8:
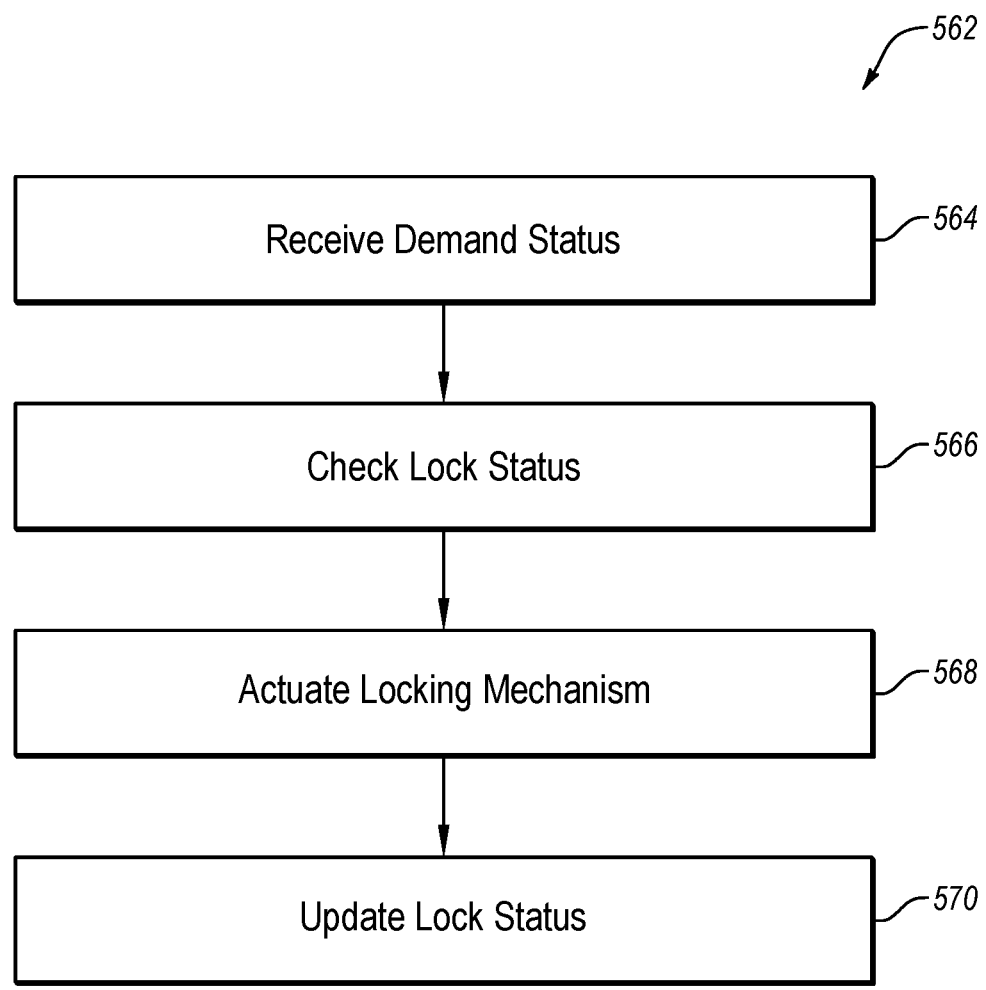
FIG. 8 is a flowchart illustrating a method of locking an electronic device, according to some implementations of the present disclosure.

FIG. 8 is a flowchart of a method 562 of locking an electronic device using a lock according to the present disclosure. In some implementations, a lock according to the present disclosure may be used in an electronic device, such as a hybrid computer or laptop. The lock may retain a first body of the electronic device in contact with and/or communication with a second body the electronic device. For example, the first body may include a display, a memory module, and a central processing unit (CPU) while the second body includes a graphical processing unit (GPU) and/or a power supply. Some implementations of a method of locking an electronic device may automatically or intelligently lock the first body to the second body when one or more components of the first body are communicating with one or more components of the second body.

In some implementations, the method 562 may include receiving a demand status from the CPU, GPU, or other component of the first body and/or second body that may communicate with other components of the electronic device at 564. For example, the demand status may include or be the processor load on the CPU, the processor load on the GPU, one or more predetermined active threads on the CPU and/or GPU, a predetermined power supply status, a storage medium access rate, other demand on the electronic device, or combinations thereof. In at least one example, a software application may send a demand status while the software application is open, indicating the electronic device is preparing and/or ready for more processor intensive operations. In at least another example, a GPU load of more than 20%, more than 30%, more than 40%, or more than 50%, over a rolling average of a predetermined time period may send a demand status. In yet another example, a battery status in the first body above a predetermined value may send a demand status indicating the first body and second body need not be locked together. In a further example, the CPU may send a demand status to lock the locking mechanism when the electronic device enters a sleep state.

The method 562 may further include checking the lock status at 566 to verify the lock is in the desired locked or unlocked state based on the demand status received at 564. In some implementations, checking the lock status may include receiving a signal from the encoder arm and/or contacts (such as described in relation to FIG. 6). In other implementations, checking the lock status may include one or more other sensors on the lock or electronic device. In yet other implementations, checking the lock status may include checking the status of a software flag retained in memory.

If the lock is not in the desired state, the lock or a part of the locking mechanism may be actuated to move to the desired state such as at 568. Actuating the locking mechanism may include any of the structures or operations described in relation to FIG. 1 through FIG. 6 of the present disclosure. After actuating the locking mechanism, the lock status may be updated at 570. The lock status may be updated by the encoder arm and contacts described in relation to FIG. 6, by other sensors on the lock, by a software flag, or combinations thereof. For example, the lock status may be updated by a sensor positioned on the engagement member. In other examples, an optical sensor may detect and update the lock status after the locking mechanism is actuated.

Figure 9:
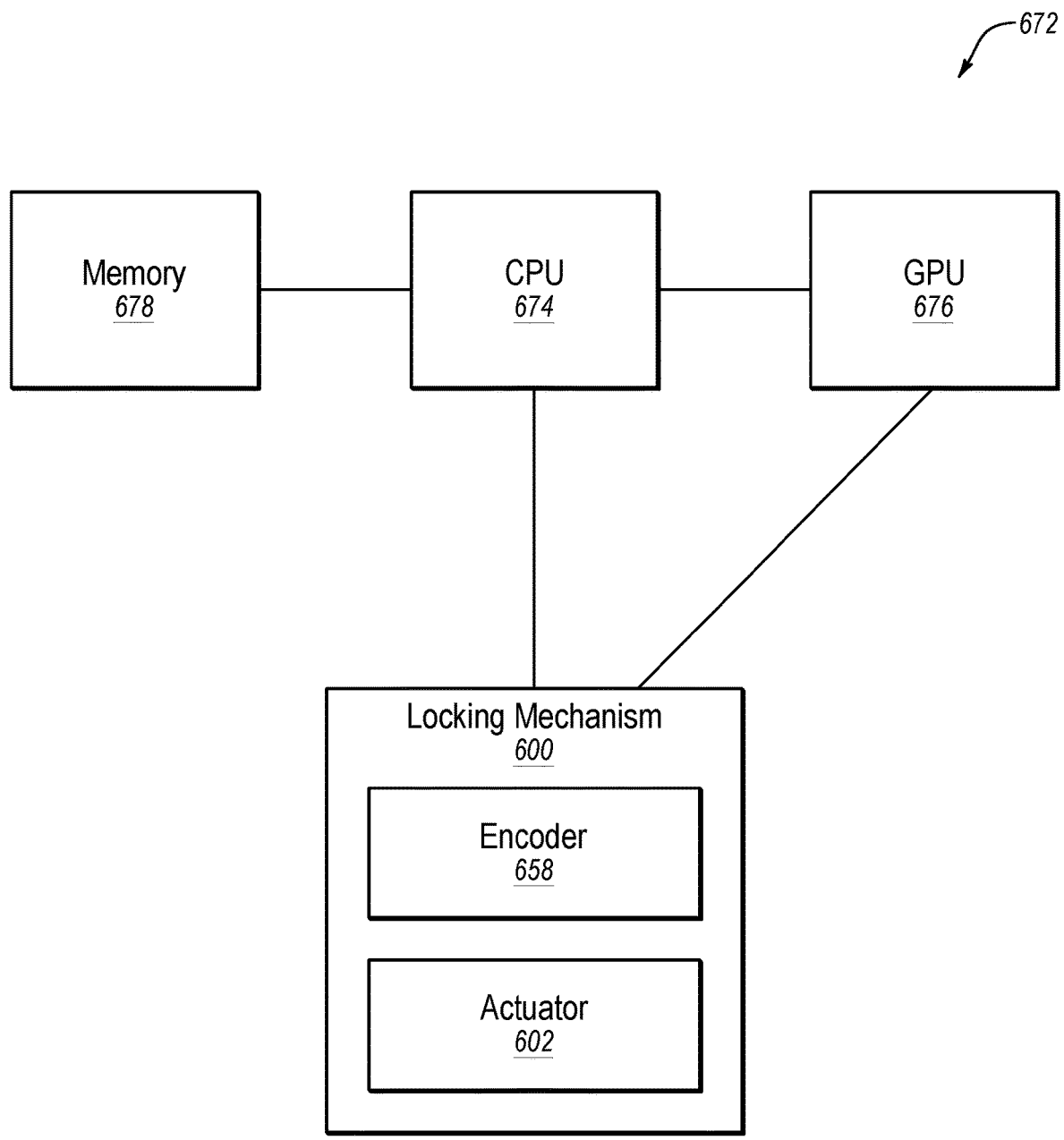
FIG. 9 is a system diagram of an implementation of an electronic device including a locking mechanism, according to some implementations of the present disclosure.

Locking mechanisms, systems, and methods described herein may be used to intelligently connect and retain one or more bodies of an electronic device relative to one another by software controls of the electronic device. FIG. 9 is a schematic representation of an implementation of an electronic device 672 including a locking mechanism 600 according to the present disclosure.

In some implementations, the locking mechanism 600 may include at least an actuator 602 and an encoder 658 or other device for checking the lock status. The locking mechanism 600 may be in data communication with a CPU 674 and/or a GPU 676 of the electronic device 672. The CPU 674 may be in communication with memory 678 having code stored thereon that, when executed by the CPU 674, may cause the CPU 674 to perform one or more steps of a method described herein.

For example, the CPU 674 may receive or generate a demand status based on the CPU load, GPU load, or other demand on one or more electronic components of the electronic device 672. The CPU 674 may actuate the actuator 602 in response to increased demand on the components of the electronic device 672. The encoder 658 or other sensor of the locking mechanism 600 communicate the lock status to the CPU 674. In other examples, the GPU 676 may send a signal to the locking mechanism when the GPU is above a predetermined load threshold, and the actuator 602 may move the locking mechanism 600 to a locked state. The locked state may be communicated back to the CPU 674 and/or GPU 676 by the encoder 658 or other sensor on the locking mechanism 600.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An apparatus for sequential actuation of a two-state device, comprising:
   a wheel having a first circumferential profile and a second circumferential profile axially adjacent to one another, the first circumferential profile having a plurality of notches with a first period to unidirectionally advance the wheel in a first direction, the second circumferential profile having a periodic radial dimension with a second period greater than the first period; and
   an actuator in contact with the first circumferential profile and configured to apply a force to at least one of the notches of the plurality of notches to rotate the wheel.

2. The apparatus of claim 1, wherein the second period is twice the first period.

3. The apparatus of claim 1, wherein the second circumferential profile is continuous between a local maximum radius and a local minimum radius.

4. The apparatus of claim 1, wherein the first circumferential profile includes a first notch and a rotationally adjacent second notch, the first notch rotationally corresponding to a local maximum radius of the second circumferential profile, and the second notch rotationally corresponding to a local minimum radius of the second circumferential profile.

5. The apparatus of claim 1, wherein the actuator includes a shape memory material (SMM) wire.

6. The apparatus of claim 1, further comprising a lever in contact with the second circumferential profile.

7. The apparatus of claim 1, further comprising a ratcheting device to limit rotation of the wheel in a second direction opposite the first direction.

8. The apparatus of claim 7, wherein the ratcheting device contacts the wheel during rotational movement of the wheel.

9. The apparatus of claim 1, wherein the wheel further comprises an encoder arm that communicates the state of the wheel to the actuator.

10. The apparatus of claim 9, wherein the encoder arm provides electrical communication with a plurality of contacts on the wheel.

11. An apparatus for sequential actuation of a two-state device, comprising:
    a wheel having a first circumferential profile and a second circumferential profile axially adjacent to one another, the first circumferential profile having a plurality of notches with a first period to advance the wheel in a first direction, the second circumferential profile having a periodic radial dimension with a second period greater than the first period;
    a ratcheting device to limit rotation of the wheel; and
    a shape memory material (SMM) wire in contact with the first circumferential profile and configured to apply a linear force to at least one of the notches of the plurality of notches to rotate the wheel.

12. The apparatus of claim 1, wherein the first circumferential profile is a sawtooth profile.

13. The apparatus of claim 1, wherein the actuator includes:
    a contact plate translatable relative to the wheel; and
    a contact arm configured to apply the force to a notch of the plurality of notches.

14. The apparatus of claim 13, wherein the contact arm includes a resilient member that applies a radial force to the notch such that the contact arm remains in contact with the notch during translational movement of the contact plate.

15. A computing device, comprising:
    a first body;
    a second body;
    a locking mechanism configured to retain the first body to the second body, the locking mechanism including:
        a wheel, including:
            a first circumferential profile having a plurality of notches; and
            a second circumferential profile axially adjacent to the first circumferential profile, the second circumferential profile having a plurality of lobes having a local maximum radius and a local minimum radius;
        an actuator, including:
            a shape-memory material (SMM) wire having a first length and a second length; and
            a contact arm connected to the SMM wire and in contact with a first notch of the plurality of notches, wherein the contact arm is configured to apply a force on the first notch based on a change in state of the SMM wire between the first length and the second length; and
        a lever in contact with the second circumferential profile such that when the lever contacts the second circumferential profile at the local maximum radius of a lobe of the plurality of lobes, the lever secures the first body to the second body.

16. The computing device of claim 15, wherein the force applied to the first notch rotates the wheel in a first direction and further comprising a ratchet arm in contact with a second notch of the plurality of notches, the ratchet arm preventing the wheel from rotating in a second direction.

17. The computing device of claim 16, further wherein the ratchet arm includes a resilient member such that the ratchet arm applies a force to the wheel in a radial direction.

18. The computing device of claim 15, wherein the lever includes:
    a thumb in contact with the second circumferential profile; and
    an engagement member movable between a locked an unlocked position, wherein in the locked position the engagement member restricts movement between the first body and the second body.

19. The computing device of claim 18, wherein the thumb is connected to the engagement member through at least one pivot.

20. The computing device of claim 15, further comprising a biasing element biasing the lever into the second circumferential profile.

* * * * *